US012403767B2

(12) United States Patent
Hori et al.

(10) Patent No.: US 12,403,767 B2
(45) Date of Patent: Sep. 2, 2025

(54) VEHICULAR DISPLAY CONTROL DEVICE, VEHICULAR DISPLAY DEVICE, VEHICULAR DISPLAY CONTROL METHOD, AND NON-TRANSITORY RECORDING MEDIUM

(71) Applicant: TOYOTA JIDOSHA KABUSHIKI KAISHA, Toyota (JP)

(72) Inventors: Keigo Hori, Toyota (JP); Ryota Hamabe, Nisshin (JP); Takahiro Hirota, Nukata-gun (JP); Yoshinori Murata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 143 days.

(21) Appl. No.: 17/850,753

(22) Filed: Jun. 27, 2022

(65) Prior Publication Data
US 2023/0059633 A1 Feb. 23, 2023

(30) Foreign Application Priority Data
Aug. 23, 2021 (JP) .................... 2021-135742

(51) Int. Cl.
*B60K 35/00* (2024.01)
*B60K 35/10* (2024.01)
(Continued)

(52) U.S. Cl.
CPC ............. *B60K 35/00* (2013.01); *B60K 35/10* (2024.01); *B60K 35/23* (2024.01); *B60K 35/28* (2024.01);
(Continued)

(58) Field of Classification Search
CPC ........ B60K 35/00; B60K 35/10; B60K 35/23; B60K 35/28; B60K 35/60; B60K 35/81;
(Continued)

(56) References Cited

U.S. PATENT DOCUMENTS

2018/0178649 A1* 6/2018 Mimura ................ B60K 35/00
2019/0071083 A1* 3/2019 Takahashi ........... B60W 30/143
(Continued)

FOREIGN PATENT DOCUMENTS

| JP | 2017-109540 A | 6/2017 |
|----|---------------|--------|
| JP | 2020-15453 A | 1/2020 |
| JP | 2021-075157 A | 5/2021 |

OTHER PUBLICATIONS

"Drive Tech: All about the Honda Odyssey and its driver assistance features," published by Youtube channel Carsplain on Jun. 16, 2020; video available at https://www.youtube.com/watch?v=Y-fqr9sJhs8 (Year: 2020).*

*Primary Examiner* — Keith D Bloomquist
(74) *Attorney, Agent, or Firm* — Oliff PLC

(57) ABSTRACT

A vehicular display control device that is configured to: display, at a display, an image of a switch that causes a transition from a first state to a second state in response to being pressed a first time and does not cause a return from the second state to the first state in response to being pressed a second time or more than a second time; and display, at the display, a text string indicating that the transition to the second state is complete in response to the switch having been pressed once in a state in which the image is displayed.

16 Claims, 12 Drawing Sheets

(51) Int. Cl.
  *B60K 35/23* (2024.01)
  *B60K 35/28* (2024.01)
  *B60K 35/60* (2024.01)
  *B60K 35/81* (2024.01)
(52) U.S. Cl.
  CPC .............. *B60K 35/60* (2024.01); *B60K 35/81* (2024.01); *B60K 2360/1446* (2024.01); *B60K 2360/172* (2024.01); *B60K 2360/782* (2024.01)
(58) Field of Classification Search
  CPC ...... B60K 2360/1446; B60K 2360/172; B60K 2360/782
  See application file for complete search history.

(56) References Cited

U.S. PATENT DOCUMENTS

| | | | |
|---|---|---|---|
| 2020/0034102 A1 | 1/2020 | Hirota et al. | |
| 2020/0062276 A1* | 2/2020 | Yuan | B60K 35/22 |
| 2021/0138903 A1* | 5/2021 | Kozono | B60K 35/00 |
| 2022/0055482 A1* | 2/2022 | Brissman | B60K 35/10 |
| 2022/0089061 A1* | 3/2022 | Farley | B60W 30/182 |

\* cited by examiner

VEHICULAR DISPLAY CONTROL DEVICE, VEHICULAR DISPLAY DEVICE, VEHICULAR DISPLAY CONTROL METHOD, AND NON-TRANSITORY RECORDING MEDIUM

CROSS-REFERENCE TO RELATED APPLICATION

This application is based on and claims priority under 35 USC 119 from Japanese Patent Application No. 2021-135742 filed on Aug. 23, 2021, the disclosure of which is incorporated by reference herein.

BACKGROUND

Technical Field

The present disclosure relates to a vehicular display control device, a vehicular display device, a vehicular display control method, and a non-transitory recording medium recorded with a vehicular display control program.

Related Art

Japanese Patent Application Laid-Open (JP-A) No. 2021-075157 discloses technology in which a layout of a switch array provided to a steering wheel of a vehicle is displayed as an image on a head-up display (HUD).

A switch array provided to the vehicle steering wheel may include a switch (also referred to as a "one-way switch") that causes a transition from a first state to a second state on being pressed a first time, and does not cause a return from the second state to the first state on being pressed a second time onward. Note that in cases in which an image of the switch array provided to the steering wheel is displayed on an HUD, a user might misunderstand the operation of the above-described one-way switch when pressed twice or more.

SUMMARY

An aspect of the present disclosure is a vehicular display control device, that includes: a memory; and a processor coupled to the memory, the processor being configured to: display, at a display, an image of a switch that causes a transition from a first state to a second state in response to being pressed a first time and does not cause a return from the second state to the first state in response to being pressed a second time or more than a second time; and display, at the display, a text string indicating that the transition to the second state is complete in response to the switch having been pressed once in a state in which the image is displayed.

DESCRIPTION OF EMBODIMENTS

Figure 1:
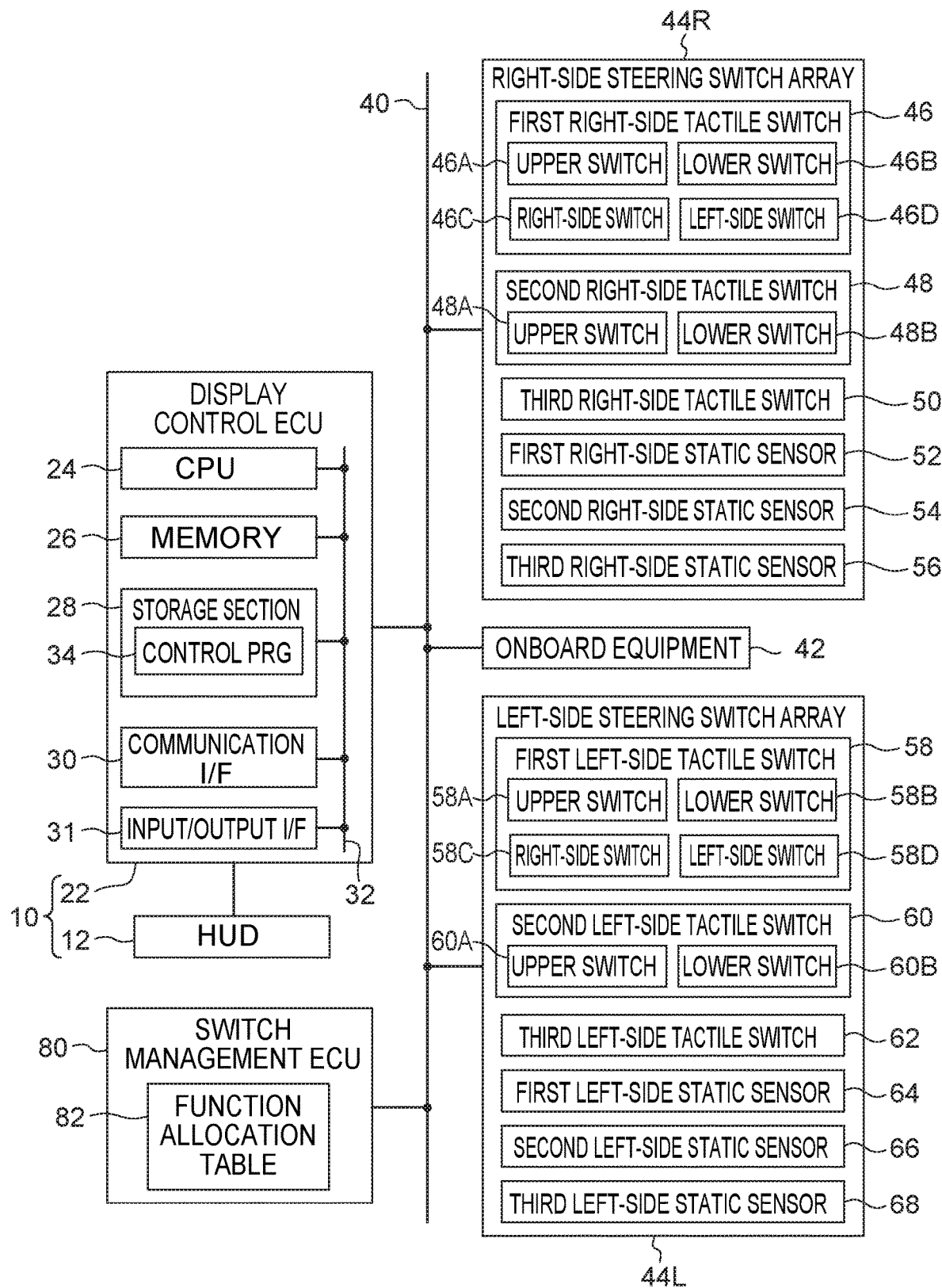
FIG. 1 is a block diagram illustrating a schematic configuration of a vehicular display device according to an exemplary embodiment and other relevant portions.

Detailed explanation follows regarding an example of an exemplary embodiment of the present disclosure, with reference to the drawings. FIG. 1 illustrates a vehicular display device 10 according to the present exemplary embodiment. The vehicular display device 10 is installed to a vehicle, and includes an HUD 12 serving as an example of a display, and a display control electronic control unit (ECU) 22 that controls display of images by the HUD 12. Note that the display control ECU 22 is an example of a vehicular display control device according to the present disclosure.

Figure 2:
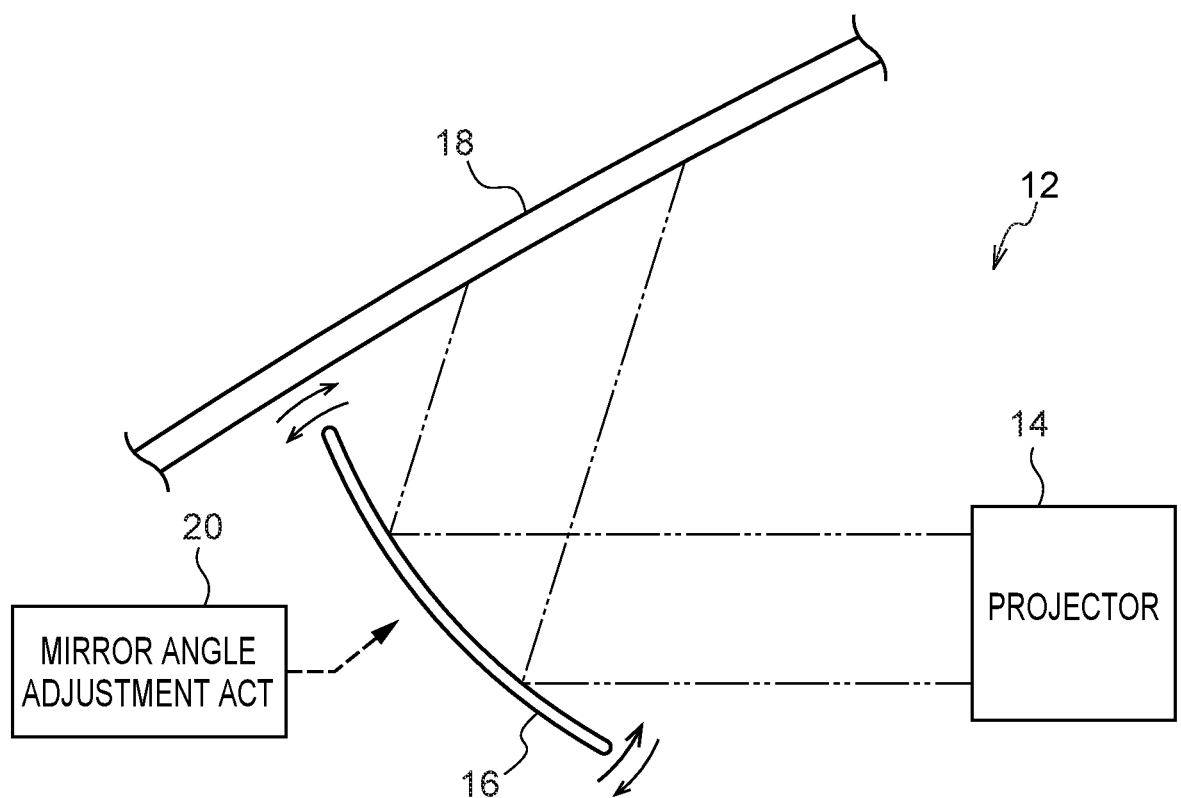
FIG. 2 is a schematic configuration diagram illustrating an example of an HUD.

As illustrated in FIG. 2, the HUD 12 includes a projector 14 that emits a projection beam of a display image, a mirror 16 formed of a concave mirror that reflects and projects the projection beam emitted from the projector 14 onto a windshield 18 of the vehicle, and a mirror angle adjustment actuator (ACT) 20. Processing such as half-silvering is performed on a vehicle cabin interior surface of a range 74 (see FIG. 4) where the display image is projected onto the windshield 18, such that a user is able to see the projected display image, and also able to see the scene outside the vehicle through the windshield 18. The mirror angle adjustment ACT 20 enables a projection position of the display image on the windshield 18 to be changed by adjusting the angle of the mirror 16.

As illustrated in FIG. 1, the display control ECU 22 includes a central processing unit (CPU) 24 serving as an example of a hardware processor, and memory 26 such as read only memory (ROM) and random access memory (RAM). The display control ECU 22 also includes a non-volatile storage section 28 such as a hard disk drive (HDD) and/or a solid state drive (SSD), a communication interface (I/F) 30, and an input/output I/F 31. The CPU 24, the memory 26, the storage section 28, the communication I/F 30, and the input/output I/F 31 are connected so as to be capable of communicating with one another through an internal bus 32.

Figure 3:
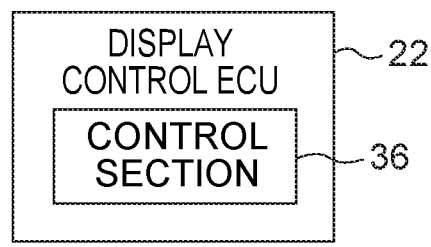
FIG. 3 is a functional block diagram illustrating a display control ECU.

A control program 34 is stored in the storage section 28. The control program 34 is read from the storage section 28 and expanded in the memory 26, and the control program 34 expanded in the memory 26 is loaded and executed by the CPU 24, such that the display control ECU 22 functions as a control section 36 illustrated in FIG. 3. Although only one CPU 24 is illustrated for simplicity, the CPU 24 may be configured of plural CPUs. Alternatively, another processor such as a GPU may be employed instead of, or in addition to, a CPU.

In a state in which an image is being displayed on the HUD 12 of a switch array (such as a steering switch array 44R or 44L, described later) including a switch that causes a transition from a first state to a second state on being pressed a first time and does not cause a return from the second state to the first state on being pressed a second time onward, the control section 36 performs the following processing. Namely, the control section 36 displays a text string on the HUD 12 indicating completion of the transition to the second state in cases in which the switch has been pressed once. Note that the control program 34 is an example of a vehicular display control program according to the present disclosure.

The display control ECU 22 is connected to a system bus 40. Onboard equipment 42, a right-side steering switch array 44R, a left-side steering switch array 44L, and a switch management ECU 80 are connected to the system bus 40. In addition to equipment such as an air conditioner, an audio system, a car navigation system, and an audio input device, the onboard equipment 42 also includes travel assistance equipment such as an Adaptive Cruise Control (ACC) device and a Lane Tracing Assist (LTA) device. Note that ACC is an example of a cruise control of the present disclosure.

Figure 4:
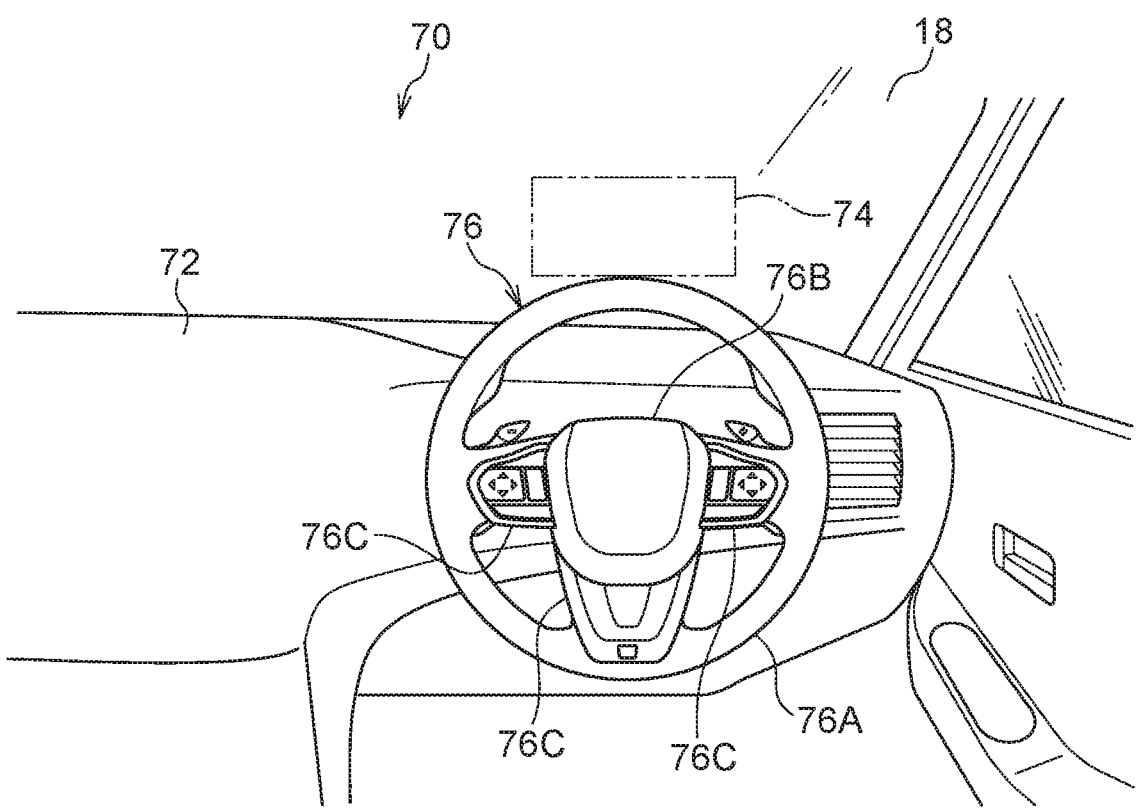
FIG. 4 is a perspective view illustrating a front section of a vehicle cabin of a vehicle as viewed from a vehicle rear side.

As illustrated in FIG. 4, an instrument panel 72 is installed at a front section of the vehicle cabin of a vehicle 70 equipped with the vehicular display device 10 according to the present exemplary embodiment. The windshield 18 is installed at a front end portion of the instrument panel 72, extends along a vehicle vertical direction and a vehicle width direction, and partitions between the vehicle cabin interior and vehicle cabin exterior. A steering wheel 76 is provided to a driving seat side (vehicle right side) of the instrument panel 72 through a steering column. The steering wheel 76 includes a substantially circular ring-shaped rim 76A. A hub 76B, configuring a central section, is provided at an inner peripheral side of the rim 76A. The rim 76A and the hub 76B are coupled together by plural (three in the present exemplary embodiment) spokes 76C.

The spokes 76C are provided at three locations, these being between the right side of the rim 76A and the hub 76B, between the left side of the rim 76A and the hub 76B, and between the lower side of the rim 76A and the hub 76B. Note that the right-side steering switch array 44R is provided to the spoke 76C between the right side of the rim 76A and the hub 76B. Similarly, the left-side steering switch array 44L is provided to the spoke 76C between the left side of the rim 76A and the hub 76B.

The right-side steering switch array 44R includes a first right-side tactile switch 46, a second right-side tactile switch 48, and a third right-side tactile switch 50, each of which is configured by a contact detector switch. The right-side steering switch array 44R also includes a first right-side static sensor 52, a second right-side static sensor 54, and a third right-side static sensor 56.

Figure 5:
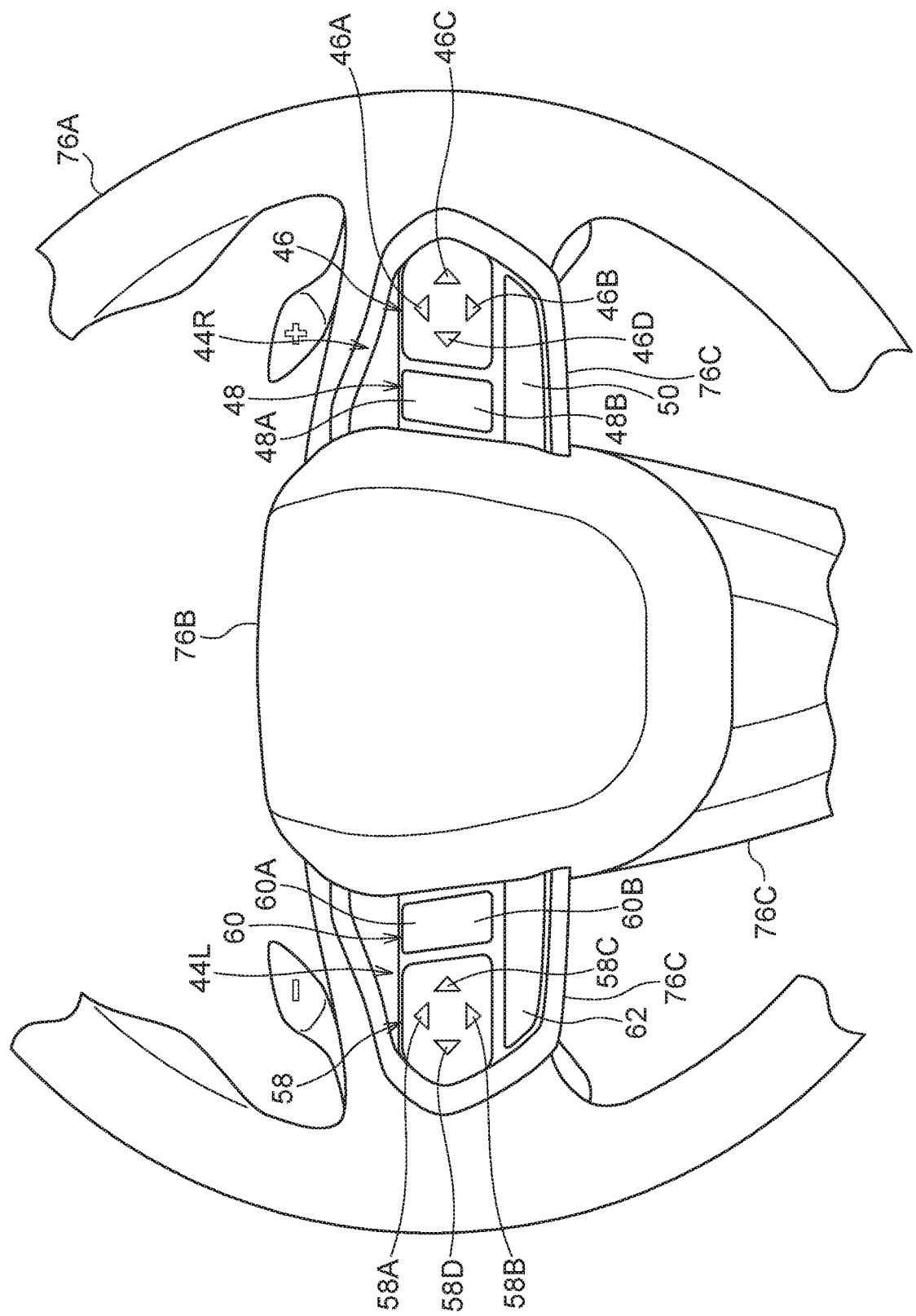
FIG. 5 is a diagram illustrating an enlarged section of a steering wheel.

As illustrated in FIG. 5, the first right-side tactile switch 46 has a substantially pentagonal shape with rounded corners, and includes an upper switch 46A, a lower switch 46B, a right-side switch 46C, and a left-side switch 46D. The first right-side tactile switch 46 is therefore configured so as to be capable of being pressed at upper, lower, left, and right sides.

The first right-side tactile switch 46 is further provided with the first right-side static sensor 52 that is capable of detecting whether a user seated in the driving seat of the vehicle (hereafter simply referred to as the "user") has touched the first right-side tactile switch 46. Specifically, the first right-side static sensor 52 is capable of detecting whether the user has touched any switch out of the upper switch 46A, the lower switch 46B, the right-side switch 46C, or the left-side switch 46D of the first right-side tactile switch 46.

When the steering wheel 76 is viewed face-on, the second right-side tactile switch 48 is installed adjacent to the left side of the first right-side tactile switch 46, is formed in a substantially rectangular shape with its length direction along the vehicle vertical direction, and includes an upper switch 48A and a lower switch 48B. Thus, the second right-side tactile switch 48 is configured so as to be capable of being pressed at upper and lower sides.

The second right-side tactile switch 48 is further provided with the second right-side static sensor 54 that is capable of detecting whether the user has touched the second right-side tactile switch 48. Specifically, the second right-side static sensor 54 is capable of detecting whether the user has touched any switch out of the upper switch 48A or the lower switch 48B of the second right-side tactile switch 48.

When the steering wheel 76 is viewed face-on, the third right-side tactile switch 50 is installed at the lower side of both the first right-side tactile switch 46 and the second right-side tactile switch 48, and is formed in a substantially rectangular shape with its length direction along the vehicle width direction. The third right-side tactile switch 50 is provided with the third right-side static sensor 56 that is configured so as to be capable of detecting whether the user has touched the third right-side tactile switch 50.

As illustrated in FIG. 1, the left-side steering switch array 44L includes a first left-side tactile switch 58, a second left-side tactile switch 60, and a third left-side tactile switch 62, each of which is configured by a contact detector switch. The left-side steering switch array 44L also includes a first left-side static sensor 64, a second left-side static sensor 66, and a third left-side static sensor 68.

As illustrated in FIG. 5, the first left-side tactile switch 58 has a substantially pentagonal shape with rounded corners, and includes an upper switch 58A, a lower switch 58B, a right-side switch 58C, and a left-side switch 58D. The first left-side tactile switch 58 is therefore configured so as to be capable of being pressed at upper, lower, left, and right sides.

The first left-side tactile switch 58 is further provided with the first left-side static sensor 64 that is capable of detecting whether the user has touched the first left-side tactile switch 58. Specifically, the first left-side static sensor 64 is capable of detecting whether the user has touched any switch out of the upper switch 58A, the lower switch 58B, the right-side switch 58C, or the left-side switch 58D of the first left-side tactile switch 58.

When the steering wheel 76 is viewed face-on, the second left-side tactile switch 60 is installed adjacent to the right side of the first left-side tactile switch 58, is formed in a substantially rectangular shape with its length direction along the vehicle vertical direction, and includes an upper switch 60A and a lower switch 60B. Thus, the second left-side tactile switch 60 is configured so as to be capable of being pressed at upper and lower sides.

The second left-side tactile switch 60 is further provided with the second left-side static sensor 66 that is capable of detecting whether the user has touched the second left-side tactile switch 60. Specifically, the second left-side static sensor 66 is capable of detecting whether the user has touched any switch out of the upper switch 60A or the lower switch 60B of the second left-side tactile switch 60.

When the steering wheel 76 is viewed face-on, the third left-side tactile switch 62 is installed at the lower side of both the first left-side tactile switch 58 and the second left-side tactile switch 60, and is formed in a substantially rectangular shape with its length direction along the vehicle width direction. The third left-side tactile switch 62 is provided with the third left-side static sensor 68 that is capable of detecting whether the user has touched the third left-side tactile switch 62.

The switch management ECU 80 illustrated in FIG. 1 includes a CPU, memory, a non-volatile storage section, a communication I/F, and so on, similarly to the display control ECU 22. A function allocation table 82 is stored in the storage section of the switch management ECU 80. Functions allocated to the respective switches of the switch arrays 44R, 44L when the vehicle 70 is in various states, and conditions under which the vehicle 70 transitions to the various states, are registered in the function allocation table 82.

When any switch out of the steering switch arrays 44R, 44L is pressed, the switch management ECU 80 reads the function allocated to this pressed switch from the function allocation table 82. The switch management ECU 80 then notifies the item of onboard equipment 42 corresponding to this read function that execution of the read function has been instructed by pressing the corresponding switch.

Figure 7:
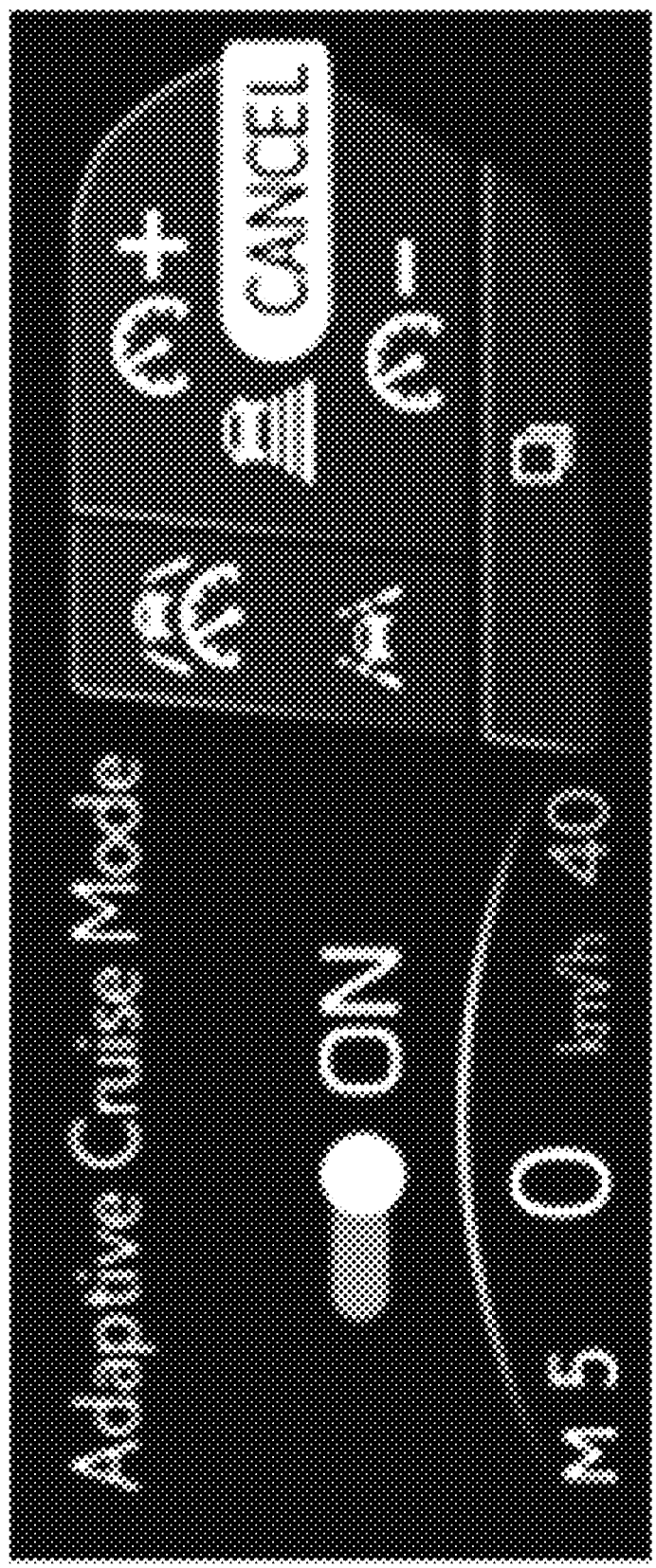
FIG. 7 is a concept diagram illustrating an example of an image displayed on an HUD while in an ACC-ON state.

For example, FIG. 7 illustrates an image of the switch array 44R displayed on the HUD 12 while the vehicle 70 is in a first state in which the ACC is ON, and the functions allocated to the respective switches are indicated by either an icon or text. For example, a function to cause the vehicle 70 to transition from the first state of ACC-ON to a second state of ACC-OFF is allocated to the right-side switch 58C. If for example the user presses the right-side switch 58C while in the first state, the switch management ECU 80 notifies the ACC device of the onboard equipment 42 that a transition to the second state of ACC-OFF has been instructed.

Figure 6:
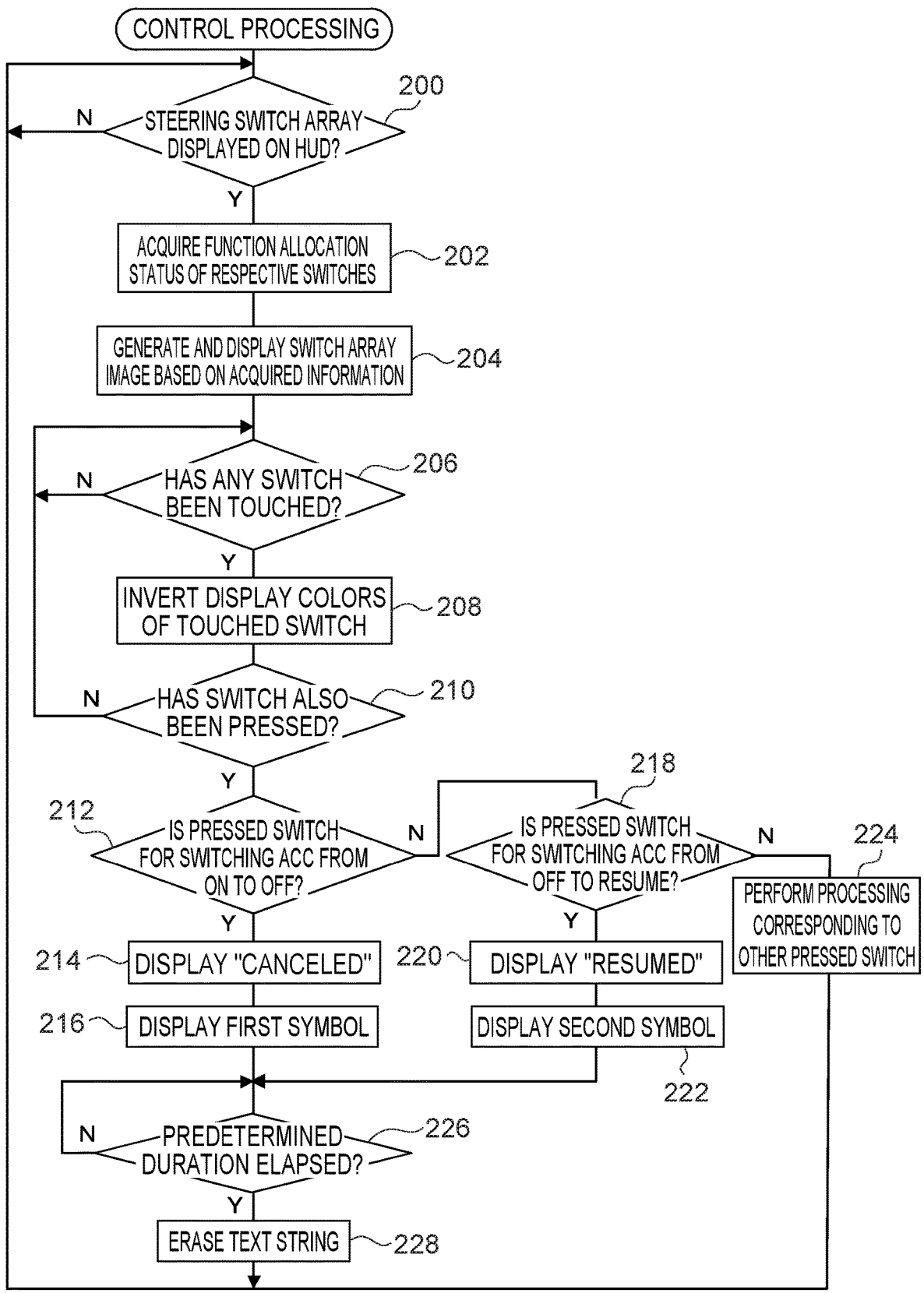
FIG. 6 is a flowchart illustrating control processing executed by a display control ECU.

Next, explanation follows regarding control processing serving as operation of the present exemplary embodiment, executed by the display control ECU 22 while an ignition switch of the vehicle 70 is on, with reference to FIG. 6.

At step 200 of the control processing, the control section 36 determines whether or not an image of at least one switch array out of the switch arrays 44R, 44L is being displayed on the HUD 12. In the present exemplary embodiment as an example, in cases in which any switch of the switch array 44R is being touched by the user, an image of the switch array 44R is displayed on the HUD 12. Similarly, in cases in which any switch of the switch array 44L is being touched by the user, an image of the switch array 44L is displayed on the HUD 12.

Thus, in cases in which none of the switches out of the switch array 44R and the switch array 44L are being touched, a negative determination is made at step 200, processing returns to step 200, and the determination of step 200 is repeated. In such cases, no image of the switch arrays 44R, 44L is displayed on the HUD 12. On the other hand, in cases in which at least one switch out of the switch arrays 44R, 44L is being touched, an affirmative determination is made at step 200 and processing proceeds to step 202. In such cases, an image of whichever switch array 44 is being touched out of the switch arrays 44R, 44L is set as a display target.

Note that after this image of the touched switch array 44 has been temporarily displayed on the HUD 12, display of this image may be removed as soon as this touch-contact is released, or display of this image may be removed at a timing when a predetermined duration has elapsed since the touch-contact was released.

At step 202, the control section 36 acquires information (information registered in the function allocation table 82) from the switch management ECU 80 indicating a function allocation status of the respective switches of the display target switch array (at least one switch array out of the switch arrays 44R, 44L).

At step 204, the control section 36 generates an image of the display target switch array (the at least one switch array out of the switch arrays 44R, 44L) based on the information acquired at step 202. Namely, first, the control section 36 reads data regarding an image representing the display target switch array 44 from the storage section 28 or the like. Next, for any switch that has been allocated a press-implemented function amongst the respective switches of the display target switch array 44, the control section 36 depicts an icon or text corresponding to this allocated function in a display region corresponding to the switch in the read image.

Figure 10:
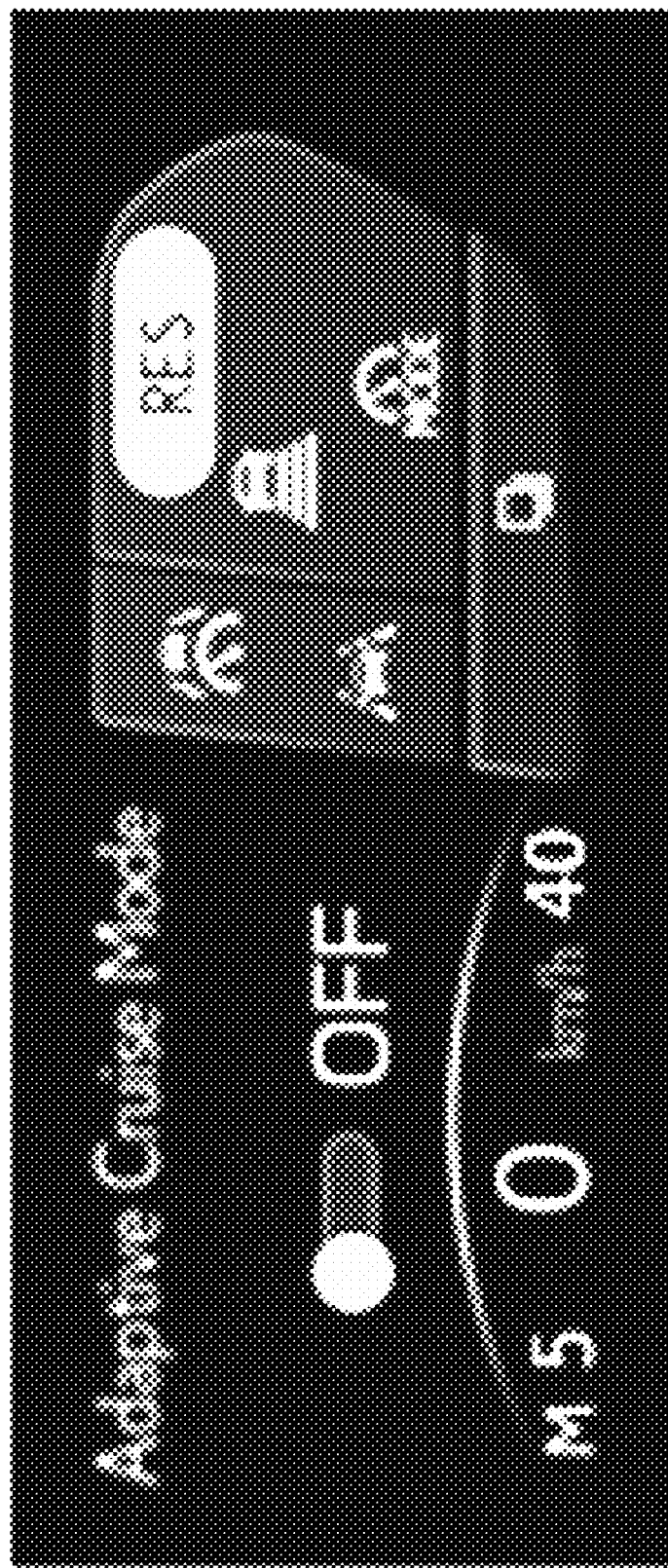
FIG. 10 is a concept diagram illustrating an example of an image displayed on an HUD while in an ACC-OFF state.

As an example, FIG. 7 illustrates a state in which icons or text corresponding to the allocated functions are depicted in display regions corresponding to the respective switches of the switch array 44R that is the display target switch array while in the ACC-ON state. As another example, FIG. 10 illustrates a state in which icons or text corresponding to the allocated functions are depicted in display regions corresponding to the respective switches of the switch array 44R that is the display target switch array while in the ACC-OFF state.

Next, the control section 36 combines an image generated by the above-described processing (an image representing the display target switch array 44) with other images displayed on the HUD 12 (such as images indicating the vehicle speed and shift position as illustrated in FIG. 7). The control section 36 then displays the combined images on the HUD 12.

Next, at step 206, the control section 36 determines whether or not any switch out of the display target switch array 44 has been touched by the user. In cases in which a negative determination is made at step 206, the processing of step 206 is repeated until an affirmative determination is made. In cases in which an affirmative determination is made at step 206, processing proceeds to step 208. At step 208, the control section 36 inverts the display colors of the icon or text displayed in the display region corresponding to the touched switch.

As an example, FIG. 7 illustrates a case in which the right-side switch 46C of the switch array 44R that is the display target switch array has been touched while in the ACC-ON state, and so the display colors of a text string "CANCEL" displayed in the display region corresponding to the right-side switch 46C are inverted. As another example, FIG. 10 illustrates a case in which the upper switch 46A of the switch array 44R that is the display target switch array has been touched while in the ACC-OFF state, and so the display colors of a text string "RES" displayed in the display region corresponding to the upper switch 46A are inverted. Inverting the display colors in the display region corresponding to the switch touched by user in this manner enables the user to be made aware of the touch position touched by the user.

At step 210, the control section 36 determines whether or not the switch that was touched by the user has also been pressed by the user. For example, in cases in which the user has moved their fingers away from the touched switch without pressing this switch, a negative determination is made at step 210 and processing returns to step 206. On the other hand, in cases in which the user has also pressed the touched switch, an affirmative determination is made at step 210 and processing proceeds to step 212.

At step 212, the control section 36 determines whether or not the switch pressed by the user is a switch for causing a transition from the ACC-ON state to the ACC-OFF state. In the present exemplary embodiment, the switch for causing a transition from the ACC-ON state to the ACC-OFF state while in the ACC-ON state illustrated in FIG. 7 is the right-side switch 46C for which a text string "CANCEL" is displayed in the corresponding display region. In this example, the right-side switch 46C is a one-way switch that enables a transition from the first state of ACC-ON to the second state of ACC-OFF on being pressed a first time, but does not cause a return from the second state of ACC-OFF to the first state of ACC-ON on being pressed a second time onward. More specifically, in this example, the right-side switch 46C is a one-way switch that has not been allocated any function for being pressed a second time onward.

Figure 8:
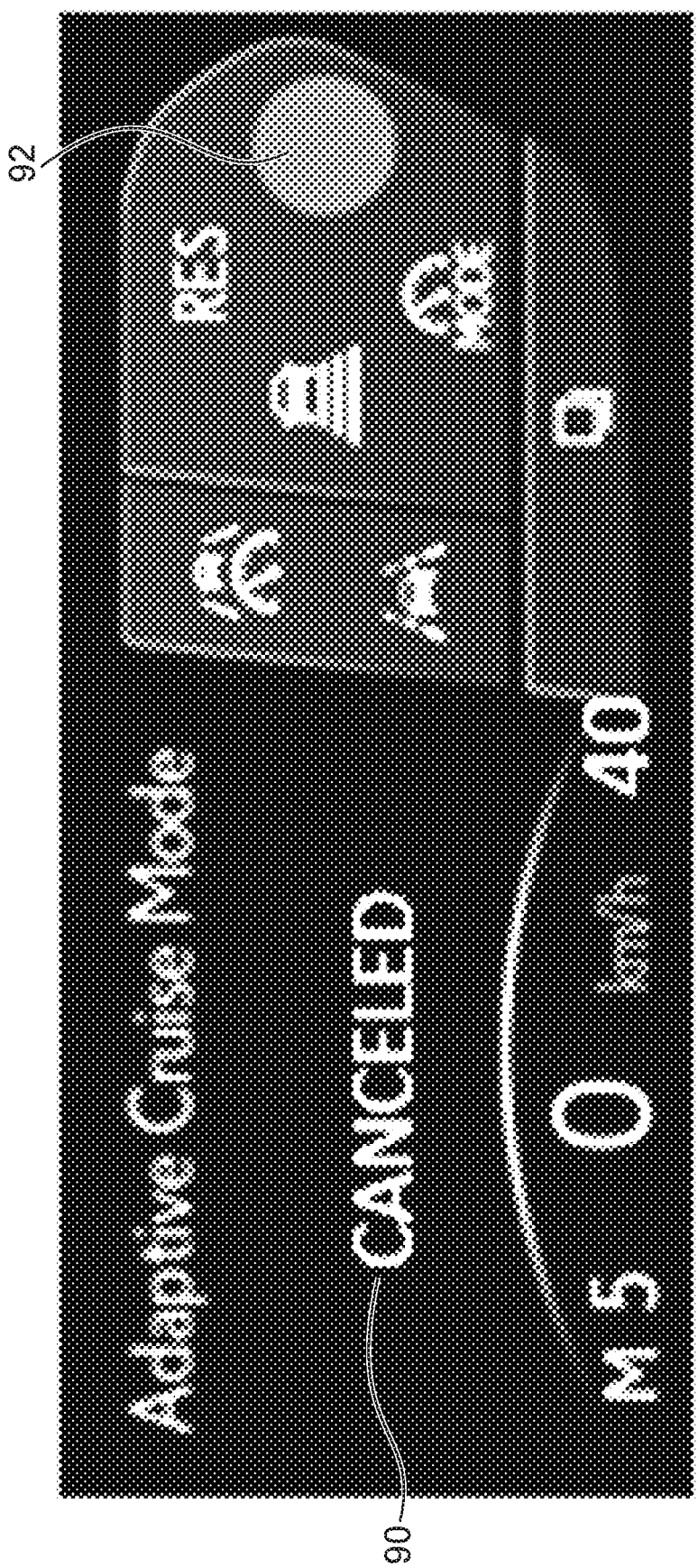
FIG. 8 is a concept diagram illustrating an example of an image displayed on the HUD when a switch has been pressed causing a transition to an ACC-OFF state from the state in FIG. 7.

Thus, in cases in which right-side switch 46C for which the text string "CANCEL" is displayed in the corresponding display region has been pressed while in the ACC-ON state illustrated in FIG. 7, an affirmative determination is made at step 212 and processing proceeds to step 214. At step 214, the control section 36 displays a text string "CANCELED" (see the text string 90 illustrated in FIG. 8), indicating that the right-side switch 46C has been pressed once and the transition to the second state of ACC-OFF is complete, in a display region at the upper side of a region where the vehicle speed and so on are displayed on the HUD 12. This enables the user to be made aware based on the text string "CANCELED" displayed on the HUD 12 that a return from the second state of ACC-OFF to the first state of ACC-ON cannot be realized by further pressing of the right-side switch 46C.

At step 216, the control section 36 displays a circular first symbol 92 (see FIG. 8), indicating that the right-side switch 46C is a switch that has not been allocated any function for being pressed a second time onward, in the display region corresponding to the right-side switch 46C on the HUD 12. This enables the user to be made aware of the operation of the right-side switch 46C when pressed twice or more, namely that the right-side switch 46C causes a transition from the first state of ACC-ON to the second state of ACC-OFF on being pressed a first time, and does not cause a return from the second state of ACC-OFF to the first state of ACC-ON on being pressed a second time onward.

After the processing of step 216, processing proceeds to step 226. At step 226, the control section 36 determines whether or not a predetermined duration has elapsed since the text string was initially displayed on the HUD 12 at step 214. Note that the predetermined duration in the determination regarding step 214 is for example a duration of approximately several seconds (such as two seconds). In cases in which a negative determination is made at step 226, the processing of step 226 is repeated until an affirmative determination is made.

Figure 9:
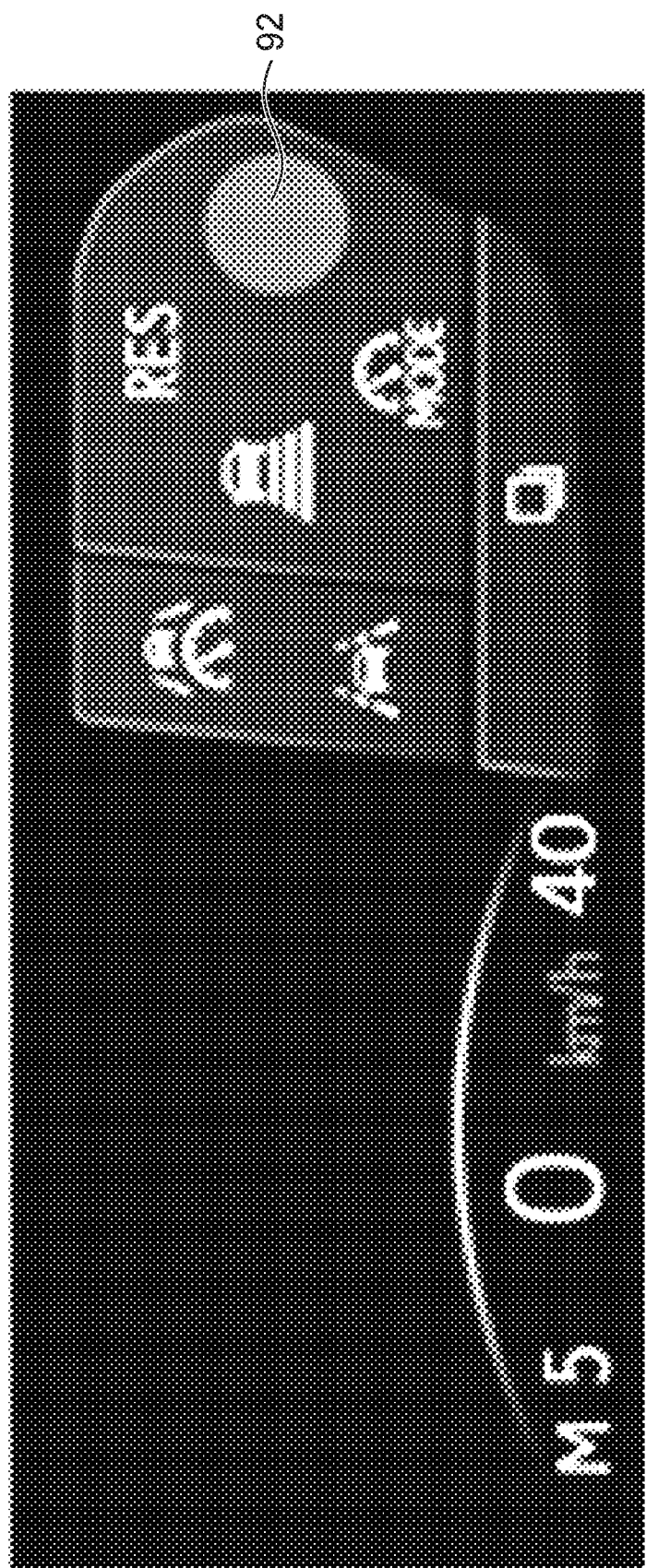
FIG. 9 is a concept diagram illustrating an example of an image displayed on the HUD after a predetermined duration has elapsed from the state in FIG. 8.

In cases in which an affirmative determination is made at step 226, processing proceeds to step 228. At step 228, the control section 36 removes the text string displayed on the HUD 12 at step 214 from the HUD 12 (see FIG. 9 also). After the processing of step 228, processing returns to step 200.

On the other hand, in cases in which the switch pressed by the user is not a switch for causing a transition from the ACC-ON state to the ACC-OFF state, a negative determination is made at step 212 and processing proceeds to step 218. At step 218, the control section 36 determines whether or not the switch pressed by the user is a switch for causing a transition from the ACC-OFF state to a state in which the ACC is activated at a latest set value (such as at a last set vehicle speed).

In the present exemplary embodiment, the switch for causing a transition from the ACC-OFF state to the state of ACC activation at the latest set value while in the ACC-OFF state as illustrated in FIG. 10 is the upper switch 46A for which a text string "RES" is displayed in the corresponding display region. In this example, the upper switch 46A is a one-way switch that enables a transition from a first state of ACC-OFF to a second state of ACC activation at the latest set value on being pressed a first time, but does not cause a return from the second state of ACC activation at the latest set value to the first state of ACC-OFF on being pressed a second time onward. More specifically, in this example, the upper switch 46A is a one-way switch that has been allocated a function other than a function to cause a transition from the second state of ACC activation at the latest set value to the first state of ACC-OFF for being pressed a second time onward, namely a function to increase a set vehicle speed during ACC.

Figure 11:
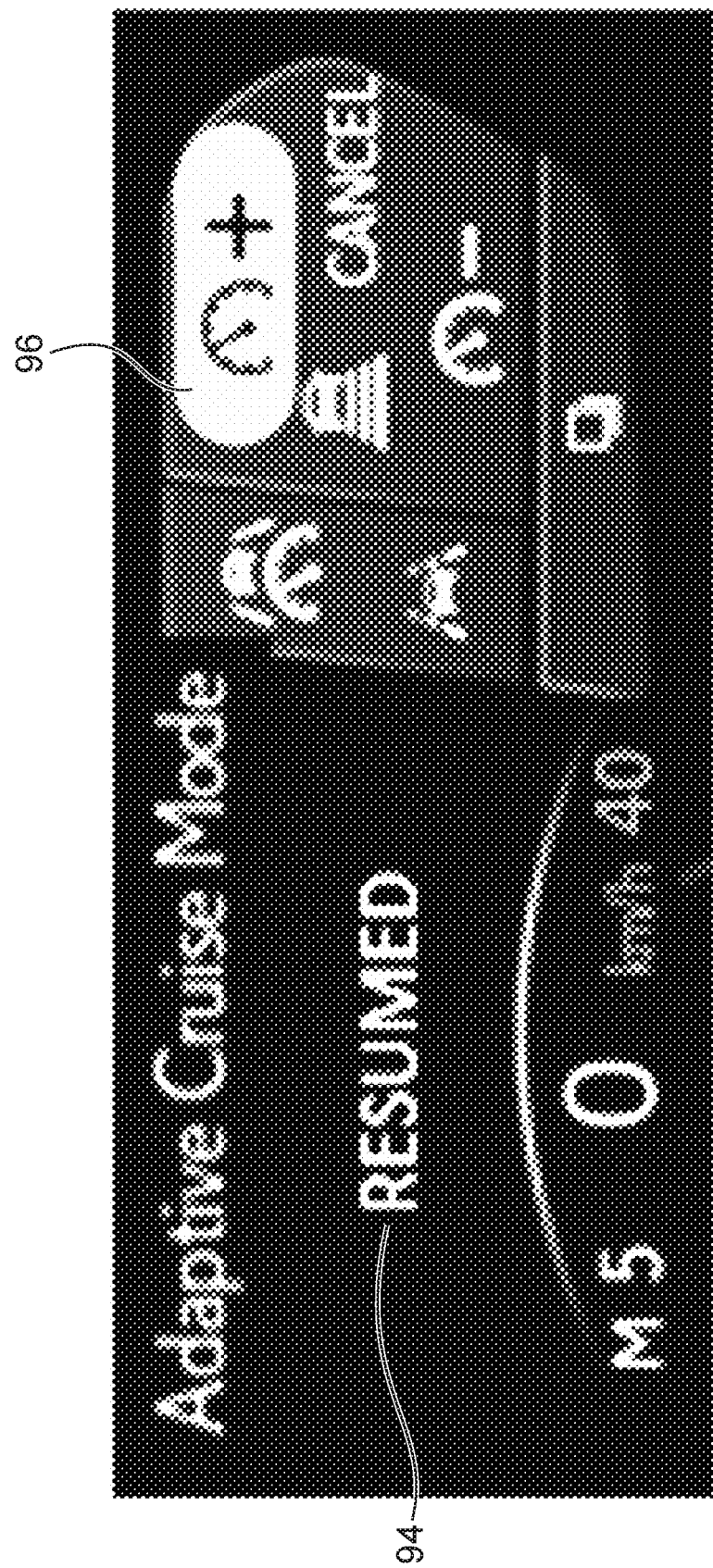
FIG. 11 is a concept diagram illustrating an example of an image displayed on the HUD when a switch has been pressed causing a transition to a state of ACC activation at a latest set value from the state in FIG. 10.

Thus, in cases in which the upper switch 46A for which the text string "RES" is displayed in the corresponding display region has been pressed while in the ACC-OFF state illustrated in FIG. 10, an affirmative determination is made at step 218 and processing proceeds to step 220. At step 220, the control section 36 displays a text string "RESUMED" (see the text string 94 in FIG. 11), indicating that the upper switch 46A has been pressed once and the transition to the second state of ACC activation at the latest set value is complete, in the display region at the upper side of the region where the vehicle speed and so on are displayed on the HUD 12. This enables the user to be made aware based on the text string "RESUMED" displayed on the HUD 12 that a return from the second state of ACC activation at the latest set value to the first state of ACC-OFF cannot be realized by further pressing of the upper switch 46A.

Furthermore, at step 222, the control section 36 displays a second symbol 96 (see FIG. 11), indicating that the upper switch 46A is a switch that has been allocated a function to increase the set vehicle speed during ACC when pressed a second time onward, in the display region corresponding to the upper switch 46A on the HUD 12. This enables the user to be made aware of operation of the upper switch 46A when pressed twice or more, namely that the upper switch 46A causes a transition from the first state of ACC-OFF to the second state of ACC activation at the latest set value on being pressed a first time, and does not cause a return from the second state of ACC activation at the latest set value to the first state of ACC-OFF on being pressed a second time onward.

Figure 12:
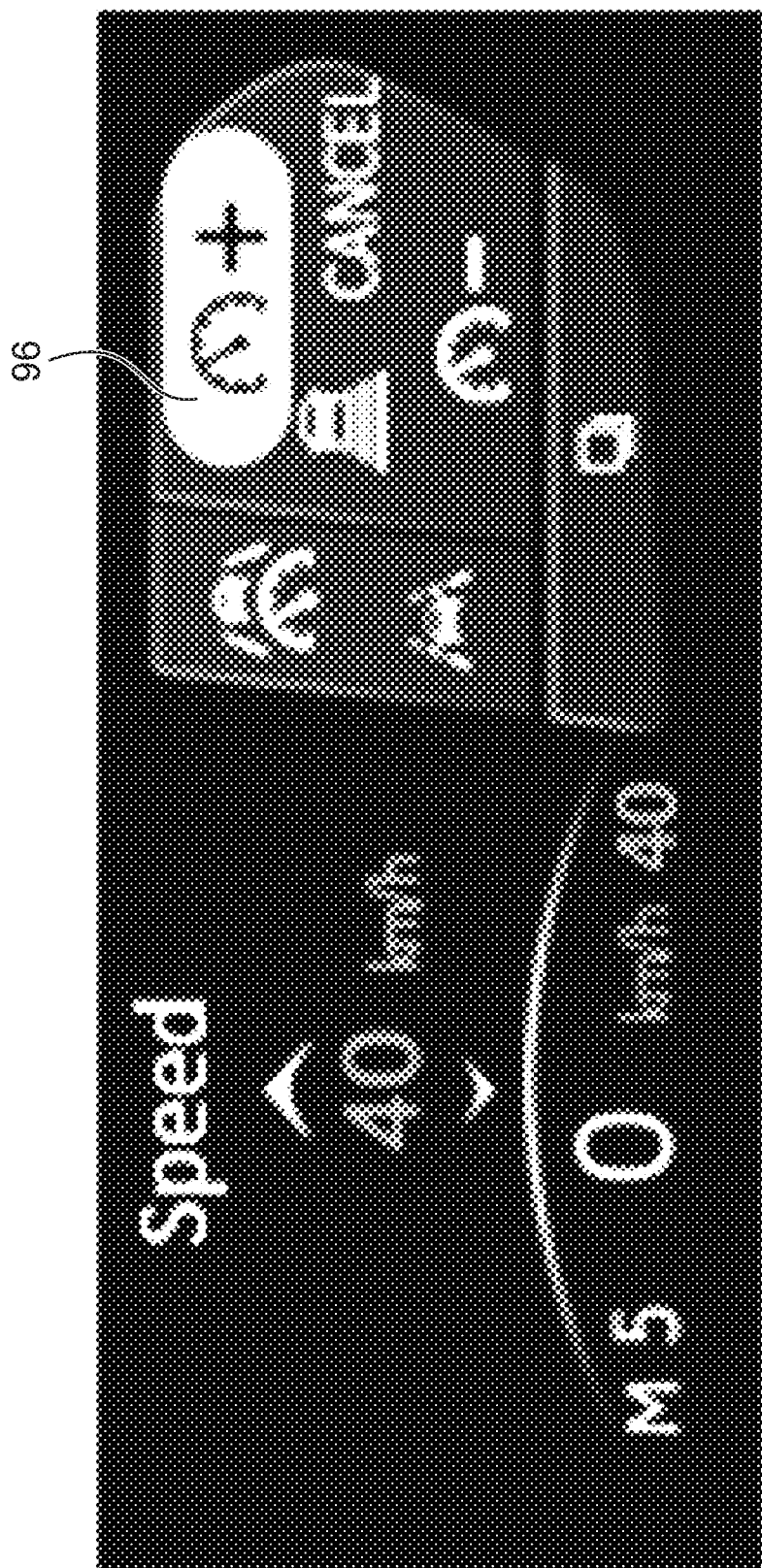
FIG. 12 is a concept diagram illustrating an example of an image displayed on the HUD after a predetermined duration has elapsed from the state in FIG. 11.

After the processing of step 222, processing proceeds to step 226. At step 226, the control section 36 determines whether or not a predetermined duration has elapsed since the text string was initially displayed on the HUD 12 at step 220. In cases in which a negative determination is made at step 226, the processing of step 226 is repeated until an affirmative determination is made. In cases in which an affirmative determination is made at step 226, processing proceeds to step 228. At step 228, the control section 36 removes the text string displayed on the HUD 12 at step 220 from the HUD 12 (see FIG. 12 also). After the processing of step 228, processing returns to step 200.

Note that in cases in which the switch pressed by the user is not a switch for causing a transition from the ACC-OFF state to the state of ACC activation at the latest set value, a negative determination is made at step 218 and processing proceeds to step 224. At step 224, the control section 36 performs processing corresponding to this other pressed switch.

Thus, in the present exemplary embodiment, in a state in which an image is being displayed on the HUD 12 of a switch that causes a transition from a first state to a second state on being pressed a first time, and that does not cause a return from the second state to the first state on being pressed a second time onward, the control section 36 performs the following processing. Namely, in cases in which the switch that does not cause a return from the second state to the first state on being pressed a second time onward has been pressed once, the control section 36 displays a text string on the HUD 12 indicating that the transition to the second state is complete. This enables the user to be made aware based on the text string displayed on the HUD 12 that a return from the first state to the second state cannot be realized by further pressing of the switch that was pressed to cause the transition from the first state to the second state.

Moreover, in the present exemplary embodiment, a switch that does not cause a return from the second state to the first state on being pressed a second time onward is a switch for causing a transition from a first state of ACC-ON to a second state of ACC-OFF. This enables the user to be made aware that a return from the ACC-OFF state to the ACC-ON state cannot be realized by further pressing of the switch that was pressed to cause the transition from the first state of ACC-ON to the second state of ACC-OFF.

Moreover, in the present exemplary embodiment, the text string indicating that the transition to the second state is complete is "CANCELED". This enables the user to intuitively ascertain that a return from the ACC-OFF state to the ACC-ON state cannot be realized by further pressing of the pressed switch.

Moreover, in the present exemplary embodiment, another switch that does not cause a return from the second state to the first state on being pressed a second time onward is a switch for causing a transition from a first state of ACC-OFF to a second state of ACC activation at the latest set value. This enables the user to be made aware that a return from the state of ACC activation at the latest set value to the ACC-OFF state cannot be realized by further pressing of the switch that was pressed to cause the transition from the ACC-OFF state to the state of ACC activation at the latest set value.

Furthermore, in the present exemplary embodiment, the text string indicating that the transition to the second state is complete is "RESUMED". This enables the user to intuitively ascertain that a return from the state of ACC activation at the latest set value to the ACC-OFF state cannot be realized by further pressing of the pressed switch.

Moreover, in the present exemplary embodiment, the control section 36 removes the text string indicating that the transition to the second state is complete after a predetermined duration has elapsed since the text string was initially displayed on the HUD 12. This enables any annoyance toward the display on the HUD 12 to be lessened compared to cases in which the text string continues to be displayed on the HUD 12 after this predetermined duration.

Moreover, in the present exemplary embodiment, the HUD is employed as the display. Thus, the amount by which the user has to shift their gaze from a state in which the user is looking ahead of the vehicle through the windshield in order to view the image displayed on the display can be reduced compared to cases in which the display is a meter display or the like.

Note that a case in which the ACC-ON state is the first state and the ACC-OFF state is the second state, and a case in which the ACC-OFF state is the first state and the state of ACC activation at the latest set value is the second state, have been described above. However, the first state and the second state of the present disclosure are not limited to these respective states, and may be other states.

Moreover, although a format has been described in which "CANCELED" and "RESUMED" are employed as examples of "a text string indicating that the transition to the second state is complete in cases in which the switch has been pressed once", there is no limitation thereto, and other text strings may be employed.

Moreover, although a case has been described in which the HUD 12 is employed as an example of the display of the present disclosure, the present disclosure is not limited thereto. The display of the present disclosure may be another display such as a meter display.

Moreover, a case has been described in which the control program 34 that is an example of the vehicular display control program according to the present disclosure is pre-stored (installed) in the storage section 28. However, the vehicular display control program according to the present disclosure may be provided in a format recorded in a non-transitory recording medium such as an HDD, an SSD, or a DVD.

The present disclosure provides a vehicular display control device, a vehicular display device, a vehicular display control method, and a non-transitory computer-readable recording medium recorded with a vehicular display control program that enable a user to be made aware that a return from a second state to a first state cannot be realized by further pressing of a switch that was pressed to cause a transition from the first state to the second state.

A first aspect of the present disclosure is a vehicular display control device, that includes: a memory; and a processor coupled to the memory, the processor being configured to: display, at a display, an image of a switch that causes a transition from a first state to a second state in response to being pressed a first time and does not cause a return from the second state to the first state in response to being pressed a second time or more than a second time; and display, at the display, a text string indicating that the transition to the second state is complete in response to the switch having been pressed once in a state in which the image is displayed.

In the first aspect, the image of the switch that causes a transition from the first state to the second state on being pressed a first time and does not cause a return from the second state to the first state on being pressed a second time onward is displayed on the display. Note that the text string indicating that the transition to the second state is complete is displayed on the display in cases in which the switch has been pressed once. This enables a user to be made aware based on the text string displayed on the display that a return from the first state to the second state cannot be realized by further pressing of the switch that was pressed to cause the transition from the first state to the second state.

A second aspect of the present disclosure is the vehicular display control device of the first aspect, wherein the switch is configured to cause a transition from the first state, in which cruise control is ON, to the second state, in which the cruise control is OFF.

The second aspect enables the user to be made aware that a return from the cruise control-OFF state to the cruise control-ON state cannot be realized by further pressing of the switch that was pressed to cause the transition from the cruise control-ON state to the cruise control-OFF state.

A third aspect of the present disclosure is the vehicular display control device of the second aspect, wherein the text string represents "canceled".

The third aspect enables the user to intuitively ascertain that a return from the cruise control-OFF state to the cruise control-ON state cannot be realized by further pressing of the pressed switch.

A fourth aspect of the present disclosure is the vehicular display control device of the first aspect, wherein the switch is for causing a transition from the first state, in which cruise control is OFF, to the second state, in which the cruise control is activated at a most recent setting value.

The fourth aspect enables the user to be made aware that a return from the state of cruise control activation at the latest set value to the cruise control-OFF state cannot be realized by further pressing of the switch that was pressed to cause the transition from the cruise control-OFF state to the state of cruise control activation at the latest set value.

A fifth aspect of the present disclosure is the vehicular display control device of the fourth aspect, wherein the text string represents "resumed".

The fifth aspect enables the user to intuitively ascertain that a return from the state of cruise control activation at the latest set value to the cruise control-OFF state cannot be realized by further pressing of the pressed switch.

A sixth aspect of the present disclosure is the vehicular display control device of any of the first to fifth aspct, wherein the processor is configured to erase display of the text string after a predetermined duration has elapsed since the text string was initially displayed on the display.

The sixth aspect enables any annoyance toward the display on the display to be lessened compared to cases in which the text string continues to be displayed on the display after this predetermined duration.

A seventh aspect of the present disclosure is the vehicular display control device of any of the first to sixth aspect, wherein the display is a head-up display.

In the seventh aspect, since the display is the HUD, the amount by which the user has to shift their gaze from a state in which the user is looking ahead of the vehicle through a windshield in order to view the image displayed on the display can be reduced compared to cases in which the display is a meter display or the like.

An eighth aspect of the present disclosure is a vehicular display device, that includes: the vehicular display control device of any of the first to seventh aspect; and the display.

Similarly to the first aspect, the eighth aspect enables the user to be made aware that a return from the first state to the second state cannot be realized by further pressing of the switch that was pressed to cause the transition from the first state to the second state.

A ninth aspect of the present disclosure is a vehicular display control method. The method includes, by a processor: displaying, at a display, an image of a switch that causes a transition from a first state to a second state in response to being pressed a first time and does not cause a return from the second state to the first state in response to being pressed a second time or more than a second time; and displaying, at the display, a text string indicating that the transition to the second state is complete in response to the switch having been pressed once in a state in which the image is displayed.

Similarly to the first aspect, the ninth aspect enables the user to be made aware that a return from the first state to the second state cannot be realized by further pressing of the switch that was pressed to cause the transition from the first state to the second state.

A tenth aspect of the present disclosure is a non-transitory computer-readable storage medium storing a vehicular display control program executable by a computer to perform vehicular display control processing. The processing includes: displaying, at a display, an image of a switch that causes a transition from a first state to a second state in response to being pressed a first time and does not cause a return from the second state to the first state in response to being pressed a second time or more than a second time; and displaying, at the display, a text string indicating that the transition to the second state is complete in response to the switch having been pressed once in a state in which the image is displayed.

Similarly to the first aspect, the tenth aspect enables the user to be made aware that a return from the first state to the second state cannot be realized by further pressing of the switch that was pressed to cause the transition from the first state to the second state.

The present disclosure exhibits an advantageous effect of enabling the user to be made aware that a return from the first state to the second state cannot be realized by further pressing of the switch that was pressed to cause the transition from the first state to the second state.

The invention claimed is:

1. A vehicular display device comprising:
a switch array including a plurality of switches located on a steering wheel of a vehicle;
a display provided in the vehicle at a location that is separate from the steering wheel, the display displaying a graphical representation of the switch array that includes information at areas of the graphical representation respectively corresponding to each of the plurality of switches, the information identifying a function that is to be performed when a user presses the switch at a location of the switch array that corresponds to a location of the area of the graphical representation having the information;
a memory; and
a processor coupled to the memory, the processor controlling the information to be displayed on the display, and the processor being configured to:
in a state in which a status of a cruise control of the vehicle is an ON state, (1) display information representing an OFF state of the cruise control of the vehicle, the information representing the OFF state of the cruise control being displayed at a first area amongst the areas of the graphical representation of the switch array, a location of the first area within the graphical representation corresponding to a location of a first switch of the plurality of switches within the switch array that causes the cruise control to transition from the ON state to the OFF state, and (2) while the information representing the OFF state of the cruise control of the vehicle is being displayed at the first area, (2a) display at a second area amongst the areas of the graphical representation of the switch array, text or an icon representing a cruise control function that is performed when a second switch of the plurality of switches of the switch array is pressed, a location of the second area within the graphical representation corresponding to a location of the second switch within the switch array, and (2b) display at a third area amongst the areas of the graphical representation of the switch array, text or an icon representing a different cruise control function that is performed when a third switch of the plurality of switches of the switch array is pressed, a location of the third area within the graphical representation corresponding to a location of the third switch within the switch array; and in response to the first switch having been pressed: (i) display, at a predefined area of the display, a text string indicating that a transition of the cruise control from the ON state to the OFF state is complete, (ii) erase the display of the information representing the OFF state at the first area of the graphical representation of the switch array, (iii) change the text or the icon that is displayed at the second area of the graphical representation of the switch array to indicate that the cruise control function that is performed when the second switch of the switch array is pressed has changed due to the transition of the cruise control from the ON state to the OFF state, and (iv) change the text or the icon that is displayed at the third area of the graphical representation of the switch array to indicate that the different cruise control function that is performed when the third switch of the switch array is pressed has changed due to the transition of the cruise control from the ON state to the OFF state.

2. The vehicular display device of claim 1, wherein the text string represents "canceled".

3. The vehicular display device of claim 1, wherein when the cruise control has transitioned to the OFF state, pressing of the second switch causes the cruise control to transition from the OFF state to the ON state, in which the cruise control is activated at a most recent setting value and, when the cruise control is in the OFF state, the text or the icon that is displayed at the second area of the graphical representation of the switch array indicates that pressing of the second switch will cause the cruise control to transition to the ON state.

4. The vehicular display device of claim 3, wherein in response to the second switch being pressed to transition the cruise control from the OFF state to the ON state, the processor causes the text string that is displayed at the predefined area to represent "resumed".

5. The vehicular display device of claim 1, wherein the processor is configured to erase display of the text string after a predetermined duration has elapsed since the text string was initially displayed at the predefined area of the display.

6. The vehicular display device of claim 1, wherein the display is a head-up display.

7. The vehicular display device of claim 1, wherein
the first switch does not perform any function when the cruise control has transitioned to the OFF state, and
when the cruise control has transitioned to the OFF state, a symbol indicating that the first switch does not perform any function is displayed at the first area.

8. The vehicular display device of claim 7, wherein the symbol is a circular symbol with no text.

9. A vehicular display control method in a vehicle having (i) a switch array including a plurality of switches located on a steering wheel of the vehicle, and (ii) a display provided in the vehicle at a location that is separate from the steering wheel, the display displaying a graphical representation of the switch array that includes information at areas of the graphical representation respectively corresponding to each of the plurality of switches, the information identifying a function that is to be performed when a user presses the switch at a location of the switch array that corresponds to a location of the area of the graphical representation having the information, the method comprising, by a processor:

in a state in which a status of a cruise control of the vehicle is an ON state, (1) displaying information representing an OFF state of the cruise control of the vehicle, the information representing the OFF state of the cruise control being displayed at a first area amongst the areas of the graphical representation of the switch array, a location of the first area within the graphical representation corresponding to a location of a first switch of the plurality of switches within the switch array that causes the cruise control to transition from the ON state to the OFF state, and (2) while the information representing the OFF state of the cruise control of the vehicle is being displayed at the first area, (2a) displaying at a second area amongst the areas of the graphical representation of the switch array, text or an icon representing a cruise control function that is performed when a second switch of the plurality of switches of the switch array is pressed, a location of the second area within the graphical representation corresponding to a location of the second switch within the switch array, and (2b) displaying at a third area amongst the areas of the graphical representation of the switch array, text or an icon representing a different cruise control function that is performed when a third switch of the plurality of switches of the switch array is pressed, a location of the third area within the graphical representation corresponding to a location of the third switch within the switch array; and in response to the first switch having been pressed: (i) displaying, at a predefined area of the display, a text string indicating that a transition of the cruise control from the ON state to the OFF state is complete, (ii) erasing the display of the information representing the OFF state at the first area of the graphical representation of the switch array, (iii) changing the text or the icon that is displayed at the second area of the graphical representation of the switch array to indicate that the cruise control function that is performed when the second switch of the switch array is pressed has changed due to the transition of the cruise control from the ON state to the OFF state, and (iv) changing the text or the icon that is displayed at the third area of the graphical representation of the switch array to indicate that the different cruise control function that is performed when the third switch of the switch array is pressed has changed due to the transition of the cruise control from the ON state to the OFF state.

10. The vehicular display control method of claim 9, wherein when the cruise control has transitioned to the OFF state, pressing of the second switch causes the cruise control to transition from the OFF state to the ON state, in which the cruise control is activated at a most recent setting value and, when the cruise control is in the OFF state, the text or the icon that is displayed at the second area of the graphical representation of the switch array indicates that pressing of the second switch will cause the cruise control to transition to the ON state.

11. The vehicular display control method of claim 9, wherein
the first switch does not perform any function when the cruise control has transitioned to the OFF state, and when the cruise control has transitioned to the OFF state, displaying, at the first area, a symbol indicating that the first switch does not perform any function.

12. The vehicular display control method of claim 11, wherein the symbol is a circular symbol with no text.

13. A non-transitory computer-readable storage medium storing a vehicular display control program executable by a computer to perform vehicular display control processing in a vehicle having (i) a switch array including a plurality of switches located on a steering wheel of the vehicle, and (ii) a display provided in the vehicle at a location that is separate from the steering wheel, the display displaying a graphical representation of the switch array that includes information at areas of the graphical representation respectively corresponding to each of the plurality of switches, the information identifying a function that is to be performed when a user presses the switch at a location of the switch array that corresponds to a location of the area of the graphical representation having the information, the processing comprising:

in a state in which a status of a cruise control of the vehicle is an ON state, (1) displaying information representing an OFF state of the cruise control of the vehicle, the information representing the OFF state of the cruise control being displayed at a first area amongst the areas of the graphical representation of the switch array, a location of the first area within the graphical representation corresponding to a location of a first switch of the plurality of switches within the switch array that causes the cruise control to transition from the ON state to the OFF state, and (2) while the information representing the OFF state of the cruise control of the vehicle is being displayed at the first area, (2a) displaying at a second area amongst the areas of the graphical representation of the switch array, text or an icon representing a cruise control function that is performed when a second switch of the plurality of switches of the switch array is pressed, a location of the second area within the graphical representation corresponding to a location of the second switch within the switch array, and (2b) displaying at a third area amongst the areas of the graphical representation of the switch array, text or an icon representing a different cruise control function that is performed when a third switch of the plurality of switches of the switch array is pressed, a location of the third area within the graphical representation corresponding to a location of the third switch within the switch array; and in response to the first switch having been pressed: (i) displaying, at a predefined area of the display, a text string indicating that a transition of the cruise control from the ON state to the OFF state is complete, (ii) erasing the display of the information representing the OFF state at the first area of the graphical representation of the switch array, (iii) changing the text or the icon that is displayed at the second area of the graphical representation of the switch array to indicate that the cruise control function that is performed when the second switch of the switch array is pressed has changed due to the transition of the cruise control from the ON state to the OFF state, and (iv) changing the text or the icon that is displayed at the third area of the graphical representation of the switch array to indicate that the different cruise control function that is performed when the third switch of the switch array is pressed has changed due to the transition of the cruise control from the ON state to the OFF state.

14. The non-transitory computer-readable storage medium of claim 13, wherein when the cruise control has transitioned to the OFF state, pressing of the second switch causes the cruise control to transition from the OFF state to the ON state, in which the cruise control is activated at a most recent setting value and, when the cruise control is in the OFF state, the text or the icon that is displayed at the second area of the graphical representation of the switch array indicates that pressing of the second switch will cause the cruise control to transition to the ON state.

15. The non-transitory computer-readable storage medium of claim 13, wherein
the first switch does not perform any function when the cruise control has transitioned to the OFF state, and
when the cruise control has transitioned to the OFF state, displaying, at the first area, a symbol indicating that the first switch does not perform any function.

16. The non-transitory computer-readable storage medium of claim 15, wherein the symbol is a circular symbol with no text.

\* \* \* \* \*